No. 870,031. PATENTED NOV. 5, 1907.
E. F. HAYES.
AXLE NUT WRENCH FOR VEHICLES.
APPLICATION FILED MAR. 19, 1907.

Witnesses:
Harry L. John
Eugene John

Inventor:
Elmer F. Hayes

UNITED STATES PATENT OFFICE.

ELMER F. HAYES, OF KIRWIN, KANSAS.

AXLE-NUT WRENCH FOR VEHICLES.

No. 870,031.  Specification of Letters Patent.  Patented Nov. 5, 1907.

Application filed March 19, 1907. Serial No. 363,324.

*To all whom it may concern:*

Be it known that I, ELMER F. HAYES, a citizen of the United States, residing at Kirwin, in the county of Phillips and State of Kansas, have invented an Axle-Nut Wrench for Vehicles, of which the following is a specification.

My invention relates to improvements in wrenches intended for use in removing the axle nut of vehicles for necessary purposes.
The object of my improvement is to provide a device for securing the axle nut rigidly to the hub and said device to operate in conjunction with the rotation of the wheel, in a backward or forward motion, when the latter is raised from the ground. I also propose to provide a device for moving the axle nut from all kinds of vehicles having a wood projection, or iron hub guard, as made by the various manufactures.

My invention consists of the combination of different features, which will appear from the following description, and are pointed out in the claims.

Figure 1:
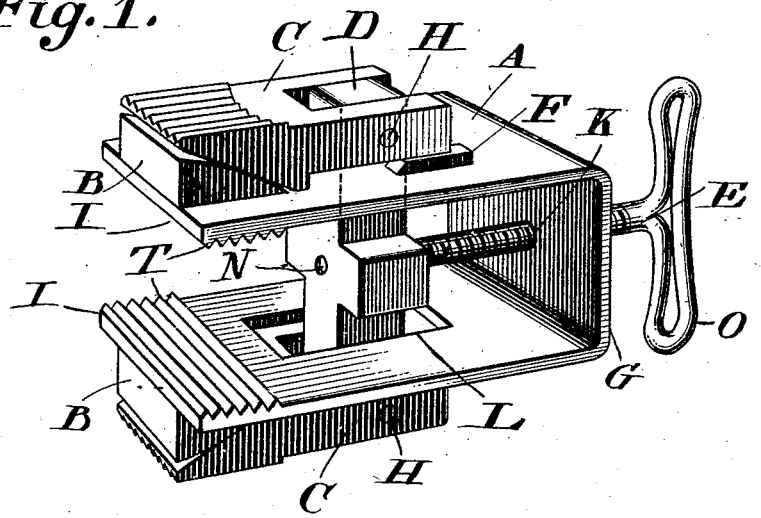
Figure 2:
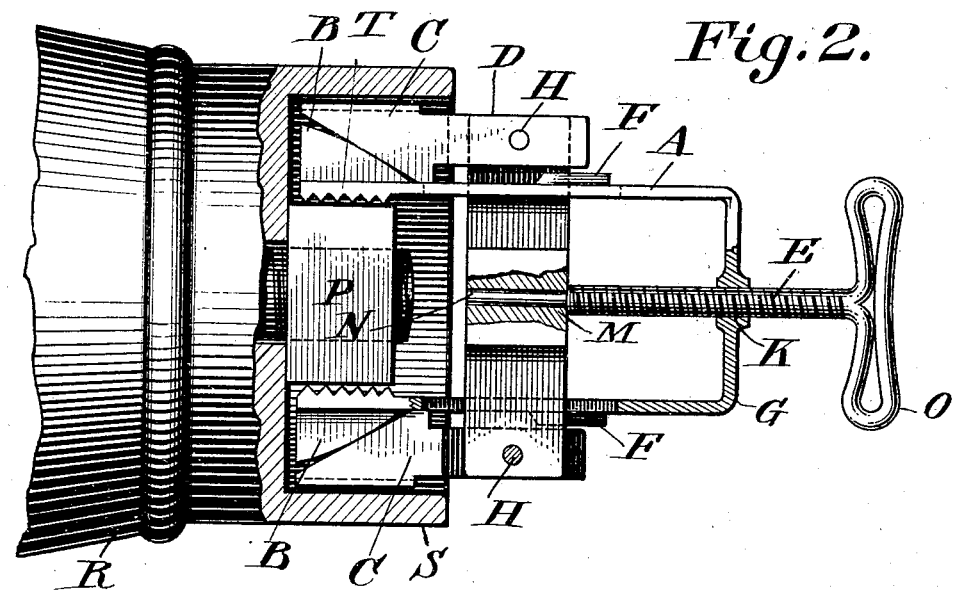

In the drawings hereto annexed, Figure 1, is a perspective view of my wrench, and Fig. 2 is a view of my invention in connection with a wheel hub, showing its application for unscrewing the axle nut.
In the construction of my device, the jaws "A" are made of one piece with a central portion for base, "G", and shaped with the free ends "I" parallel to each other. The inner sides of the free ends "I", have a corrugated face "T", for the purpose of penetrating any substance that may adhere to the axle nut. On the outer side of the free ends "I" of the jaws "A", are secured lugs "B", with an oval face, to receive dogs "C", with a V shaped face, fluted on the upper side, and secured by pins "H", at each end of an adjustable connecting rod "D", passing through a longitudinal opening "L", in jaws "A" for the adjustment of the connecting rod "D", which carries the dogs "C". The thumb screw "E", passes through a threaded eye "K" in center of base "G". The screw stem "E", has on its inner end a reduced portion "M", which passes through an aperture "N" in center of connecting rod "D", and riveted, or otherwise secured. The screw stem "E" is extended on its outer end and formed in shape for thumb piece "O", for the handy rotation in its operation. To hold the dogs "C" in position for use, are secured lugs "F" on the outer side of jaws "A", and underneath the end of said dogs "C".

Fig. 2 illustrates the application of my device to the axle nut "P", of a wheel hub "R", with a hub-band "S". The wrench is placed on the axle nut "P" in such a manner that the corrugated face "T", on the jaws "A" clamp the axle nut "P" thereof, and the dogs "C" lie within the hub band "S"; the thumb piece "O", is then turned, which moves the connecting rod "D" that carries the dogs "C" and forces them between lugs "B" and hub-band "S", with a downward pressure on the lugs "B", and upward pressure on hub-band "S", which secures the axle nut "P" rigidly to hub of wheel. The wheel is then raised from the ground and rotated in a backward direction carrying the nut "P", which unscrews it from the axle, when the wheel may be removed, still carrying the axle nut and also the wrench. After oiling the axle, the wheel is replaced and rotated in a forward direction, thus securing the nut to the axle, when the wrench may be removed by turning the thumbscrew "E," in a left hand direction.

Having thus described my invention, I do not limit myself to the precise mechanical details, especially to the length of the connecting rod, or to the length of the face of the dogs, but reserve the right to their modification, but still embodying the principle of my invention.

I claim,

1. An axle nut wrench, having the body formed of a member with a basal center the free ends of such member forming the jaws lugs secured on the outer side of said jaws an adjustable connecting rod and dogs secured at each end of said rod which rod in combination with a screw member moves the dogs against said lugs, thus forcing the V shaped ends of the dogs in an outward direction against the hub band, which secures the jaws to the axle nut.

2. An axle nut wrench having the body formed of a member with a basal center the free ends of such member forming the jaws, lugs secured on the outer side of said jaws an adjustable connecting rod which passes through longitudinal slots in the member of said jaws and dogs secured at each end of said rod, which rod, in combination with a screw member moves the dogs with respect to the lugs on said jaws.

3. An axle nut wrench having the body formed of a member with a basal center the free ends of such member forming the jaws lugs secured on the outer side of said jaws, an adjustable connecting rod which passes through longitudinal slots in the member of said jaws, dogs secured at each end of said rod and a screw member having a threaded engagement with an eye in the basal portion of the member of said jaws and rotatively secured to said connecting rod, whereby said rod is adjusted to move the dogs with respect to the lugs on the free ends of said jaws.

4. An axle nut wrench having the body formed of a member with a basal center the free ends of such member forming the jaws lugs secured on the outer side of said jaws an adjustable connecting rod which passes through longitudinal slots in the member of said jaws dogs secured at each end of said rod and a screw member with a thumb piece on its outer end and having a threaded engagement with an eye in the basal portion of the member of said jaws and rotatively secured to said connecting rod whereby said rod is adjusted to move the dogs with respect to the lugs on the free ends of said jaws.

5. An axle nut wrench having the body formed of a member with a basal center the free ends of such member forming the jaws having a corrugated face on the inner side lugs secured on the outer side of said jaws an adjustable connecting rod which passes through longitudinal slots in the member of said jaws dogs secured at each end of said rod, and a screw member with a thumb piece on its outer end and having a threaded engagement with an eye in the basal portion of the member of said jaws and rotatively secured to said connecting rod, whereby said rod is adjusted to move the dogs with respect to the lugs on the free ends of said jaws.

6. An axle nut wrench having the body formed of a member with a basal center the free ends of such member forming the jaws having a corrugated face on the inner side and lugs secured on the outer side of said jaws an adjustable connecting rod which passes through longitudinal slots in the member of said jaws, dogs secured at each end of said rod lugs secured on the outer side of the member forming said body, for holding the dogs in position for use, and a screw member with a thumb piece on its outer end and having a threaded engagement with an eye in the basal portion of the member of said jaws and rotatively secured to said connecting rod whereby said rod is adjusted to move the dogs with respect to the lugs on the free ends of said jaws.

7. An axle nut wrench having the body formed of a member and lugs secured on the outer side of the free ends of such member forming the jaws, an adjustable connecting rod, dogs secured at each end of said rod, and a screw member with a thumb piece on its outer end and rotatively secured to said rod, whereby said rod is adjusted to move the dogs with respect to the lugs on the free ends of said jaws.

ELMER F. HAYES.

Witnesses:
HARRY JOHN,
C. C. GOETZ.